(12) United States Patent
Michelman

(10) Patent No.: US 6,255,375 B1
(45) Date of Patent: Jul. 3, 2001

(54) REPULPABLE HOT MELT PAPER COATING AND COATED PRODUCT

(75) Inventor: John S. Michelman, Cincinnati, OH (US)

(73) Assignee: Michelman, Inc., Cincinatti, OH (US)

( * ) Notice: Subject to any disclaimer, the term of this patent is extended or adjusted under 35 U.S.C. 154(b) by 1164 days.

(21) Appl. No.: 08/743,151

(22) Filed: Nov. 4, 1996

Related U.S. Application Data

(63) Continuation of application No. 08/371,362, filed on Jan. 11, 1995, which is a continuation of application No. 07/907,173, filed on Jul. 1, 1992, now abandoned, which is a continuation of application No. 07/416,529, filed on Oct. 3, 1989, now abandoned.

(51) Int. Cl.$^7$ .................. C08L 5/36; C08L 5/01
(52) U.S. Cl. .................. 524/322; 524/478; 524/479; 162/4; 162/5; 106/268; 106/270; 427/391; 427/411; 427/416
(58) Field of Search .................. 524/322, 478, 524/479; 162/4, 5; 106/268, 270; 427/391, 411, 416

(56) References Cited

U.S. PATENT DOCUMENTS

| | | |
|---|---|---|
| 1,410,739 | 3/1922 | Dunwell .................. 162/6 |
| 2,538,397 | 1/1951 | Szwarc . |
| 2,614,922 | 10/1952 | Hope . |
| 2,703,754 | 3/1955 | Myers . |
| 2,783,161 | 2/1957 | Padgett . |
| 2,845,398 | 7/1958 | Brown et al. . |
| 2,859,110 | 11/1958 | Sanford . |
| 2,862,900 | 12/1958 | Bryant et al. . |
| 2,959,513 | 11/1960 | Savage . |
| 2,964,487 | 12/1960 | Chapman et al. . |
| 2,967,116 | 1/1961 | Hollinger et al. . |
| 2,982,333 | 5/1961 | Little . |
| 3,021,252 | 2/1962 | Hill et al. . |
| 3,055,791 | 9/1962 | Elias . |
| 3,058,871 | 10/1962 | Davis et al. . |
| 3,085,026 | 4/1963 | Weisberger et al. . |
| 3,306,882 | 2/1967 | Pullen et al. . |
| 3,308,006 | 3/1967 | Kresse et al. . |
| 3,328,325 | 6/1967 | Zdanowski . |
| 3,417,040 | 12/1968 | Kremer . |
| 3,428,591 | 2/1969 | Lewis . |
| 3,467,547 | 9/1969 | Harvey et al. . |
| 3,479,327 | 11/1969 | Merijan et al. . |
| 3,538,030 | 11/1970 | Chamness . |
| 3,574,153 | 4/1971 | Sirota . |
| 3,659,772 | 5/1972 | Dorsey et al. . |
| 3,660,333 | 5/1972 | Kremer . |
| 3,822,178 | 7/1974 | Von Koeppen et al. . |
| 3,870,668 | 3/1975 | Fischer et al. . |
| 3,887,506 | 6/1975 | Hewitt . |
| 3,912,674 | 10/1975 | Stahl . |
| 3,950,578 | 4/1976 | Laumann .................. 427/378 |
| 3,964,915 | 6/1976 | Doenges et al. . |
| 4,117,199 | 9/1978 | Gotoh et al. .................. 428/486 |
| 4,348,293 | 9/1982 | Clarke et al. . |
| 4,352,855 | 10/1982 | Hiraishi et al. . |
| 4,380,565 | 4/1983 | Krankkala . |
| 4,396,731 | 8/1983 | Dawans et al. . |
| 4,401,722 | 8/1983 | Matsui . |
| 4,554,083 | 11/1985 | Soldanski et al. . |
| 4,748,196 | 5/1988 | Kuroda et al. . |
| 4,767,669 | 8/1988 | Conklin et al. . |
| 4,895,567 | 1/1990 | Colon et al. . |
| 4,990,184 | 2/1991 | Dotson et al. . |
| 5,217,798 | 6/1993 | Brady et al. .................. 428/246 |
| 5,336,528 | 8/1994 | Bohme .................. 429/361 |
| 5,587,202 | 12/1996 | Sandvick et al. .................. 427/155 |
| 5,599,596 | 2/1997 | Sandvick et al. .................. 428/34.2 |

FOREIGN PATENT DOCUMENTS

| | | |
|---|---|---|
| 47829 | 4/1977 | (JP) . |
| 35063 | 2/1980 | (JP) . |
| 949983 | 7/1980 | (JP) . |
| 61-47896 | 3/1986 | (JP) . |
| 63-5943 | 1/1988 | (JP) . |
| 1134588 | 1/1895 | (SU) . |
| 94/18272 | 2/1993 | (WO) . |

OTHER PUBLICATIONS

"Repulpability of coated corrugated paperboard", Reprinted from TAPPI Journal, vol. 74, No. 10, Oct. 1991, John S. Michelman and David M. Capella.

Primary Examiner—Peter D. Mulcahy
(74) Attorney, Agent, or Firm—Killworth, Gottman, Hagan & Schaeff, L.L.P.

(57) ABSTRACT

A hot melt wax coating composition and hot melt wax coated paper product are provided which coating contains at least one chemical compound which is either itself capable of acting as a latent dispersant for the coating or capable of being chemically modified so as to act as a dispersant for the coating, within an aqueous environment, thus rendering the hot melt coating more readily dispersable from the coated paper. The coated paper product is repulpable using standard paper mill equipment.

24 Claims, No Drawings

REPULPABLE HOT MELT PAPER COATING AND COATED PRODUCT

CROSS REFERENCE TO RELATED APPLICATIONS

This application is a continuation of Ser. No. 08/371,362, filed Jan. 11, 1995, which application is a continuation of Ser. No. 07/907,173, filed Jul. 1, 1992, now abandoned, which is a continuation of Ser. No. 07/416,529, filed Oct. 3, 1989, now abandoned.

TECHNICAL FIELD

The present invention relates generally to a hot melt wax coating composition containing at least one chemical compound which is either itself capable of acting as a latent dispersant for the coating or capable of being chemically modified so as to act as a dispersant for the coating, within an aqueous environment, thus rendering the hot melt coating more readily redispersable. The present invention also relates to a coated paper product using such coating which renders the coated paper more readily repulpable (recyclable) with standard paper mill equipment. Other related aspects of the present invention include a method of coating paper with the novel coating composition and a method of repulping such coated paper.

BACKGROUND OF THE INVENTION

Paper and paperboard products are frequently coated in order to form a barrier against gases such as moisture; liquids such as water, oils or other solvents; and solids such as ice and greases. Should the paper be used as a container, it is advantageous to have a coating which acts as a barrier to both internally or externally sourced gases, liquids or solids such as those mentioned above.

Another benefit of coating paper is to render the paper relatively nonabrasive so as to prevent a container made from such paper from damaging, or being damaged by, the container contents or adjacent surfaces This can occur for instance when a paper container and its contents are exposed to the vibration attendant to long distance travel such as by truck or train.

Another reason for coating paper is to increase the structural integrity of the paper by rendering it more rigid Thus, a container made of coated paper has more strength both under normal conditions and in more hostile environments, such as moisture-containing environments and/or corrosive environments.

Yet another reason for coating paper is that it allows a manufacturer to apply a color and/or gloss to the paper to make it more appealing to the customer or user of the paper product or its contents.

There are many types of widely used commercial coatings examples of which include solvent-borne coatings, water-borne coatings, powder coatings, radiation curable coatings and hot melt coatings. The present invention relates to hot melt wax coatings which enjoy some advantages over other types of coatings including low cost, ease of application and not requiring the application and subsequent evaporation of greater amounts of solvent or water on and from the paper substrate.

In spite of the substantial advantages afforded by hot melt coated papers, such materials suffer from one major disadvantage in that they cannot be easily recycled and must, therefore, be disposed of as waste (such as by burning) or used as landfill. In recent years, increased environmental awareness has made these alternatives increasingly less desirable, if not illegal, and impracticable. Specifically, the hot melt coating cannot be readily separated from the paper substrate, and the hot melt coating does not break down in aqueous environment of a pulping machine, such as those used in the recycling of paper products. As a result, the hot melt coating contaminates and clogs the pulping and paper-making machinery. The hot melt coated papers of the prior art have not been recyclable and have thus rendered a potentially valuable pulp resource a serious waste disposal problem.

Hot melt coating materials are, of course, well known and can be obtained in the form of molten liquids or thermoplastic slabs, flakes or pellets. Typical examples of such materials include natural and/or synthetic plastics and waxes as set forth, for instance, in U.S. Pat. No. 3,058,871 to Davis, U.S. Pat. No. 2,859,110 to Sanford and U.S. Pat. No. 3,021,252 to Hill. Such thermoplastic materials include, for instance, paraffin, microcrystalline wax and other waxes, which may be used with additives such as hydrocarbon resins and synthetic polymers.

As stressed in the aforementioned U.S. Pat. No. 3,058,871 to Davis, numerous prior attempts have been made to recover pulp from hot melt coated waste paper. However, it has been generally found that the waxes and plastics present on and impregnated in such paper are difficult to separate effectively without seriously contaminating the pulp and the paper-making machinery. In U.S. Pat. No. 3,058,871 to Davis and U.S. Pat. No. 2,703,754 to Myers, for example, attempts were made to separate the hot melt coating from the pulp by solvent extraction of the coating. In U.S. Pat. No. 3,055,791 to Elias, solid absorbents were used in an attempt to recover pulp, whereas in U.S. Pat. No. 3,021,252 to Hill and U.S. Pat. No. 2,859,110 to Sanford, the coating was mechanically separated from the fiber. In U.S. Pat. No. 2,703,754 to Myers, the separation of pulp and coating material was made by a combination of emulsification and solvent extraction.

The most frequently suggested procedure for recycling hot melt coated paper involves suspending the coating particles in a hot aqueous system as suggested in U.S. Pat. 3,822,178 to Von Koeppen et al, U.S. Pat. No. 2,614,922 to Hope, U.S. Pat. No. 2,859,110 to Sanford and U.S. Pat. 2,959,513 to Savage.

All of the above-discussed patents are hereby incorporated herein by reference Of the above, perhaps the most significant process is described in the Von Koeppen et al patent. It is pointed out in this prior art patent that if paper cannot be recycled, serious disposal problems result. However, as noted above, paper mills have not been able to recycle waxed paper stock in the past because of process and equipment difficulties. In order to enable waxed paper stock to be used in Fourdrinier, cylinder and wet-lap processes, Von Koeppen et al suggests charging a pulper or beater with hot melt coated or impregnated paper and combining this charge with water and certain nonionic emulsifiers at a temperature high enough to melt the hot melt coating. Although, as a result of emulsification, substantial quantities of wax, or other paper coating material, are extracted in the emulsified phase, an unsatisfactorily high amount of the coating material remains unemulsified in the system.

Thus, whereas emulsification of paper coatings is perhaps the most promising coated paper recycling process, it has not been totally satisfactory and is not in widespread commercial usage. In fact, as stated in U.S. Pat. 3,055,791 to Elias, removal of organic coatings by emulsification has been attempted without appreciable success.

Although not to be limited by theory, applicant suggests that the lack of success experienced by these prior art coatings and emulsification processes is due, in large part, to the lack of immediate intimate mixing of the emulsifier with the coating and thus the lack of complete emulsification. The coatings tend to float in a pulper and physically segregate themselves from emulsifiers charged therein, making the coatings difficult to emulsify.

Accordingly, it is a primary object of the present invention to provide a latent dispersant, surfactant or emulsifier (or a chemically modifiable precursor thereof) incorporated into the hot melt paper coating itself to overcome the shortcomings of the prior art discussed above.

It is another object of the invention to provide an emulsification process wherein adequate emulsification of hot melt coated paper is achieved to permit such coated paper to be commercially recycled.

A further object of the invention is to create a pulping mixture which does not require a physical separation between a hot melt coating and the paper in a pulper during a recycling process.

Yet another object of the invention is to provide a paper with a hot melt coating which may be readily and adequately emulsified during recycling in a conventional repulping process without deleteriously affecting the process equipment or resulting paper. The type of pulper which may be used in repulping the coated paper of the present invention include any of those pulpers known in the art such as a Hydropulper, Hollander and the like. The slurry can then be transferred to any type of processing equipment, whether Fourdrinier, cylinder, or other equipment.

Another object of the present invention is to provide a hot melt coating which can be readily emulsified or dispersed during a repulping process.

Additional objects, advantages, and other novel features of the invention will be set forth in part in the description that follows and in part will become apparent to those skilled in the art upon examination of the following or may be learned with the practice of the invention. The objects and advantages of the present invention may be realized and attained by means of the compositions and methods particularly pointed out in the appended claims, including the functional equivalents thereof

SUMMARY OF THE INVENTION

To achieve the foregoing objects and provide other advantages, and in accordance with the purposes of the present invention described herein, the present invention provides an improved hot melt coating comprising (a) at least one wax; and (b) at least one chemical compound incorporated in such at least one wax which is either itself capable of dispersing such at least one wax in a substantially aqueous environment, or capable of undergoing chemical modifications so as to be capable of dispersing such at least one wax in a substantially aqueous environment Thus, the hot melt wax coating of the present invention includes a latent dispersant, emulsifier or surfactant (or chemically modifiable precursor thereof) so that the hot melt coating of the present invention affords all of the advantages of other hot melt coatings while being more readily dispersable in a substantially aqueous environment.

As used herein, hot melt coatings are defined, and shall include, compositions used to coat or impregnate such paper substrates as paper, paperboard, corrugated liner board and medium, and the like used on panels, cartons, cups, plates, containers and miscellaneous packagings; and which are applied as liquids at temperatures above room temperature, normally between about 30° C. to about 200° C., and which, upon cooling, form solid coatings on the paper.

Also, as used herein, the terms emulsifier, dispersant, surfactant, surface acting agent and detergent (and the corresponding verbs emulsify and disperse) are used interchangeably and mutually inclusive to mean substances which aid in rendering the wax portion of the hot melt coating (including optional resin or emulsifiable wax components thereof) more soluble or miscible in a substantially aqueous environment.

In accordance with the present invention, there are two general classes of latent dispersants which can be utilized. The first class comprises chemical compounds which are themselves soluble or miscible in the wax component of the hot melt coating composition of the present invention and are capable of undergoing chemical modification so as to be capable of dispersing the was component of the hot melt coating composition (including any optional emulsifiable waxes and/or resins as described hereinbelow).

The second general class of latent dispersants comprise those chemical compounds which are soluble or miscible within the wax component of the hot melt coating composition (including the above-mentioned optional ingredients) and which are themselves capable of dispersing such wax components and other optional ingredients without prior chemical modification.

Both first and second classes of latent dispersants may include any anionic, nonionic or cationic dispersants, emulsifiers or surfactants known in the art. Examples of such compounds can be found in *McCutcheon's Emulsifiers and Detergents North American Edition*, The Manufacturing Confectioner Publishing Company, Glen Rock, N. J. (1988), which is hereby incorporated herein by reference.

Examples of anionic dispersants include acids, esters, alcohols, sulfonates and soaps. Cationic dispersants are exemplified by amines and amides and their reaction products. Ethoxylated nonylphenols are examples of nonionic dispersants. Such dispersants preferably contain between 10 and 30 carbon atoms. The dispersant(s) in total are preferably present in the range of from about 10 to about 30 percent of the recyclable hot melt coating The wax or waxes used in accordance with the present invention include a wide variety of waxes and resinous compositions which have been employed in paper coatings. Such waxes include animal, vegetable and mineral waxes such as paraffin and microcrystalline waxy as well as synthetic waxes such as polyethylene As used herein, the term "wax" shall include all such waxes and such resinous compositions used in hot melt coating compositions known in the art.

In general, it is preferred that any such wax have a melting point in the range of from about 30° C. to about 200° C. and a softening point rendering it free-flowing within said temperature range, such as a viscosity of from about 5 to about 2000 CPS at 120° C. The wax component is preferably present within a range from about 50 to 90 percent of the recyclable hot melt coating. It is also understood that mixtures of resins and/or waxes may also be applied in the hot melt coating of the present invention.

The hot melt coating of the present invention may also include optional resins which may be used to give the coating composition more pronounced characteristics, such as increased gloss or rigidity, as desired. Typical amounts of such resins are generally within the range of from about 0 to 10 percent Such optional resins include, for example thermoplastic polymeric materials such as hydrocarbon resins, ethylene vinylacetate, polyethylene and the like.

Another optional ingredient which may be incorporated in the hot melt coating of the present invention is one or more emulsifiable waxes. Such emulsifiable waxes can be generally described as functionalized waxes (such as those having an acid or ester number greater than zero) which increase the overall emulsifiability of the hot melt coating composition in a substantially aqueous environment. An example of such an emulsifiable wax is oxidized polyethylene. Emulsifiable wax(es) in total may be present in the range of from about 0 to about 30 percent of the recyclable hot melt coating.

An example of a latent dispersant of the first class (i.e. requiring chemical modification), is stearic acid which can be converted to an emulsifiable form by the addition of a strong base such as sodium hydroxide or potassium hydroxide.

Another aspect of the present invention is a method of coating paper with the hot melt coating of the present invention, and a coated paper resulting therefrom. To prepare such a coated paper, the hot melt coating composition is prepared by mixing at least one wax (together with any optional resin or emulsifiable wax) and at least one chemical compound which acts as a latent dispersant (or chemically modifiable precursor thereof) as described above. Such mixture is maintained at a temperature sufficient to render it liquid and may be applied by a variety of techniques known in the art including spraying, curtain coating, roller coating, cascading and dipping.

The coated paper product can then be repulped by placing the coated paper product in an aqueous environment and applying a sufficient amount of chemical and physical energy to convert the paper to a pulp form. In the case where a latent dispersant of the second class described above (i.e. requiring chemical modification to exhibit dispersant character) is used in the hot melt coating composition, the repulping mixture must include a chemical agent capable of modifying such compound so as to render it capable of dispersing the wax portion of the coating composition (and any optional resin or emulsifiable wax). As pointed out above, in the case where the latent dispersant is stearic acid, it may be converted to its dispersant form by the addition of a strong base, such as sodium hydroxide or potassium hydroxide, into the repulping mix.

DETAILED DESCRIPTION OF THE PREFERRED EMBODIMENTS

Having been given the general teachings of the present invention above, it remains to illustrate it by means of specific examples.

Some examples of the preferred coating composition of the present invention (with or without optional ingredients) are set forth in the following Table 1 Such examples are the best mode of the invention. It will be understood that the percentage ranges below may be varied to achieve or adjust desired coating characteristics. All percent amounts used herein refer to percent by weight.

TABLE 1

| Ingredient | Sample A | Sample B | Sample C |
| --- | --- | --- | --- |
| Paraffin | 50–90% | 50–90% | 50–90% |
| Emulsifiable wax | 0–30% | 0–30% | 0 |

TABLE 1-continued

| Ingredient | Sample A | Sample B | Sample C |
| --- | --- | --- | --- |
| (optional) Hydrocarbon resin (optional) | 0 | 0–30% | 0–30% |
| Dispersant | 10–30% | 10–30% | 10–30% |

Sample A is an example of a hot melt coating composition containing paraffin wax as the major component of the coating composition with a dispersant of the above-described first class requiring chemical modification, (such as stearic acid) and an optional emulsifiable wax. Sample B is a hot melt coating composition again with paraffin as the major coating composition component, a dispersant, an optional emulsifiable wax (such as polyethylene) and an optional hydrocarbon resin added to alter characteristics, such as rigidity, of the coating composition. Sample C is the same paraffin-based coating composition using only the dispersant and the optional hydrocarbon resin component.

The preferred hot melt coating compositions described above may be applied using any of the methods described above.

In order to repulp paper containing the coatings described in Samples A, B and C; the paper is placed in a substantially aqueous environment and if the first class dispersant is used, it is appropriately chemically modified so as to render it capable of acting as a dispersant for the hot melt coating. Such chemical modification may be done according to methods known in the art and will, of course, vary with the type of first class dispersant used. For example, if stearic acid is used, an appropriate chemical modification may be treatment with a strong base (such as KOH and NaOH). The paper is further subjected to chemical and mechanical energy (such as in a repulping system) sufficient to render the paper into pulp form The particular embodiments discussed above were chosen in order to best illustrate the invention and its practical application to thereby enable one of ordinary skill in the art to best utilize the invention in various embodiments and with various modifications as are suited to the particular use contemplated. It is intended that the scope of the invention be defined by the claims appended hereto.

In light of the present disclosure, modifications and variations can be made to the present invention in accordance with the knowledge of one ordinarily skilled thereof without departing from the spirit of the invention

What is claimed is:

1. A hot melt wax coating composition comprising:
   from about 50–90% by weight of at least one wax selected from the group consisting of paraffin wax and microcrystalline wax,
   from about 10–30% of at least one chemical compound incorporated in said at least one wax which is capable of undergoing chemical modification so as to be capable of dispersing said at least one wax in a substantially aqueous environment, and
   a thermoplastic polymeric material selected from the group consisting of hydrocarbon resins and copolymers of ethylene and vinyl acetate.

2. A hot melt wax coating composition as claimed in claim 1 in which said chemical compound is selected from the group consisting of amines, amides, alcohols, acids, esters, and soaps having between 10 and 30 carbon atoms.

3. A hot melt wax coating composition as claimed in claim 1 in which said chemical compound comprises stearic acid.

4. A hot melt wax coating composition as claimed in claim 1 further comprising at least one emulsifiable wax.

5. A paper coated by the hot melt wax coating composition of claim 1.

6. The paper of claim 5 in which said paper is a corrugated paper having a lining component and a medium component, and wherein at least one of said components is coated with said hot melt wax composition.

7. The paper of claim 5 in which said paper is a corrugated paper having a lining component, a medium component, and a double-back liner components, and wherein at least one of said components is coated with said hot melt wax composition.

8. A hot melt wax coating composition comprising:
from 50–90% by weight paraffin wax, from 10–30% by weight of at least one chemical compound incorporated in said at least one wax which is capable of undergoing chemical modification so as to be capable of dispersing said at least one wax in a substantially aqueous environment,
a thermoplastic polymeric material, and
at least one emulsifiable wax.

9. A hot melt wax coating composition as claimed in claim 8 in which said chemical compound is selected from the group consisting of amines, amides, alcohols, acids, esters, and soaps having between 10 and 30 carbon atoms.

10. A hot melt wax coating composition as claimed in claim 8 in which said chemical compound comprises stearic acid.

11. A hot melt wax coating composition comprising:
from about 50–90% by weight of at least one wax selected from the group consisting of paraffin wax and microcrystalline wax,
from about 10–30% of at least one chemical compound incorporated in said at least one wax which is capable of dispersing said at least one wax in a substantially aqueous environment, and
a thermoplastic polymeric material selected from the group consisting of hydrocarbon resins and copolymers of ethylene and vinyl acetate.

12. A hot melt wax coating composition as claimed in claim 11 in which said chemical compound is selected from the group consisting of ethoxylated nonylphenols, amines, amides, alcohols, acids, esters, and soaps having between 10 and 30 carbon atoms.

13. A hot melt wax coating composition as claimed in claim 11 further comprising at least one emulsifiable wax.

14. A paper coated by the hot melt wax coating composition of claim 11.

15. The paper of claim 14 in which said paper is a corrugated paper having a lining component, a medium component, and a double-back liner components, and wherein at least one of said components is coated with said hot melt wax composition.

16. A hot melt wax coating composition comprising:
from about 50–90% by weight of at least one wax selected from the group consisting of paraffin wax and microcrystalline wax, said wax having a melting point in the range of from about 30° C. to about 200° C. and a softening point rendering it free-flowing within said temperature range,
from about 10–30% of a dispersant for said wax in a substantially aqueous environment, said dispersant being soluble or miscible in said wax,
a thermoplastic polymeric material selected from the group consisting of hydrocarbon resins and copolymers of ethylene and vinyl acetate, and
an emulsifiable wax.

17. A recyclable hot melt wax coated paper comprising:
a paper substrate coated with a hot melt wax coating wherein said hot melt wax coating is coated directly onto said paper substrate,
said hot wax melt coating composition comprising:
from about 50–90% by weight of at least one wax selected from the group consisting of paraffin wax and microcrystalline wax,
from about 10–30% of at least one chemical compound incorporated in said at least one wax which is capable of undergoing chemical modification so as to be capable of dispersing said at least one wax in a substantially aqueous environment, and
a thermoplastic polymeric material selected from the group consisting of hydrocarbon resins and copolymers of ethylene and vinyl acetate.

18. The paper of claim 17 in which said paper is a corrugated paper having a liner component and a medium component, and wherein at least one of said components is directly coated with said hot melt wax composition.

19. A recyclable hot melt wax coated paper comprising:
a paper substrate coated with a hot melt wax coating wherein said hot melt wax coating is coated directly onto said paper substrate,
said hot melt wax coating composition comprising:
from about 50–90% by weight of at least one wax selected from the group consisting of paraffin wax and microcrystalline wax,
from about 10–30% of at least one chemical compound incorporated in said at least one wax which is capable of dispersing said at least one wax in a substantially aqueous environment, and
a thermoplastic polymeric material selected from the group consisting of hydrocarbon resins and copolymers of ethylene and vinyl acetate.

20. The paper of claim 19 in which said paper is a corrugated paper having a liner component and a medium component, and wherein at least one of said components is directly coated with said hot melt wax composition.

21. A recyclable hot melt wax coated paper comprising:
a paper substrate coated with a hot melt wax coating wherein said hot melt wax coating is impregnated into said paper substrate,
said hot wax melt coating composition comprising:
from about 50–90% by weight of at least one wax selected from the group consisting of paraffin wax and microcrystalline wax,
from about 10–30% of at least one chemical compound incorporated in said at least one wax which is capable of undergoing chemical modification so as to be capable of dispersing said at least one wax in a substantially aqueous environment, and
a thermoplastic polymeric material selected from the group consisting of hydrocarbon resins and copolymers of ethylene and vinyl acetate.

22. The paper of claim 21 in which said paper is a corrugated paper having a liner component and a medium component, and wherein at least one of said components is impregnated with said hot melt wax composition.

23. A recyclable hot melt wax coated paper comprising:

a paper substrate coated with a hot melt wax coating wherein said hot melt wax coating is impregnated into said paper substrate, said hot melt wax coating composition comprising:

from about 50–90% by weight of at least one wax selected from the group consisting of paraffin wax and microcrystalline wax, from about 10–30% of at least one chemical compound incorporated in said at least one wax which is capable of dispersing said at least one wax in a substantially aqueous environment, and a thermoplastic polymeric material selected from the group consisting of hydrocarbon resins and copolymers of ethylene and vinyl acetate.

24. The paper of claim 23 in which said paper is a corrugated paper having a liner component and a medium component, and wherein at least one of said components is impregnated with said hot melt wax composition.

* * * * *

UNITED STATES PATENT AND TRADEMARK OFFICE
CERTIFICATE OF CORRECTION

PATENT NO. : 6,255,375 B1
DATED : July 3, 2001
INVENTOR(S) : John S. Michelman

It is certified that error appears in the above-identified patent and that said Letters Patent is hereby corrected as shown below:

Title page,
Item [73], "Cincinatti" should be -- Cincinnati --.

Column 1,
Line 44, "rigid" should be -- rigin. --.

Column 2,
Line 46, "reference Of" should be -- reference. -- (new paragraph) -- Of --.

Column 3,
Line 44, "thereof" should be -- thereof. --.
Line 56, "environment" should be -- environment. --.

Column 4,
Line 18, "was component" should be -- wax component --.
Line 49, "waxy" should be -- wax, --.
Line 67, "10 percent" should be -- 10 percent. --.

Column 5,
Line 35, "second class" should be -- first class --.
Line 55, "Table 1" should be -- Table 1. --.

UNITED STATES PATENT AND TRADEMARK OFFICE
CERTIFICATE OF CORRECTION

PATENT NO. : 6,255,375 B1
DATED : July 3, 2001
INVENTOR(S) : John S. Michelman

It is certified that error appears in the above-identified patent and that said Letters Patent is hereby corrected as shown below:

Column 6,
Line 27, "B and C;" should be -- B and C, --.
Line 38, "form" should be -- form. --.
Line 49, "invention" should be -- inventon. --.

Signed and Sealed this

Fifteenth Day of January, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO. : 6,255,375 B1
DATED : July 3, 2001
INVENTOR(S) : John S. Michelman

It is certified that error appears in the above-identified patent and that said Letters Patent is hereby corrected as shown below:

<u>Title page,</u>
Item [73], "Cincinatti" should be -- Cincinnati --.

<u>Column 1,</u>
Line 44, "rigid" should be -- rigid. --

<u>Column 2,</u>
Line 46, "reference Of" should be -- reference. -- (new paragraph) -- Of --.

<u>Column 3,</u>
Line 44, "thereof" should be -- thereof. --.
Line 56, "environment " should be -- environment. --.

<u>Column 4,</u>
Line 18, "was component" should be -- wax component --.
Line 49, "waxy" should be -- wax, --.
Line 67, "10 percent" should be -- 10 percent. --.

<u>Column 5,</u>
Line 35, "second class" should be -- first class --.
Line 55, "Table 1" should be -- Table 1. --.

UNITED STATES PATENT AND TRADEMARK OFFICE
CERTIFICATE OF CORRECTION

PATENT NO.    : 6,255,375 B1
DATED         : July 3, 2001
INVENTOR(S)   : John S. Michelman It is certified that error appears in the above-identified patent and that said Letters Patent is hereby corrected as shown below:

<u>Column 6,</u>
Line 27, "B and C;" should be -- B and C, --.
Line 38, "form" should be -- form. --.
Line 49, "invention" should be -- invention. --.

This certificate supersedes Certificate of Correction issued January 15, 2002.

Signed and Sealed this

Fourth Day of June, 2002

*Attest:*

*Attesting Officer*

JAMES E. ROGAN
*Director of the United States Patent and Trademark Office*